Dec. 31, 1935. H. E. BRANDT ET AL 2,026,210
DISPENSING DEVICE
Filed July 21, 1934
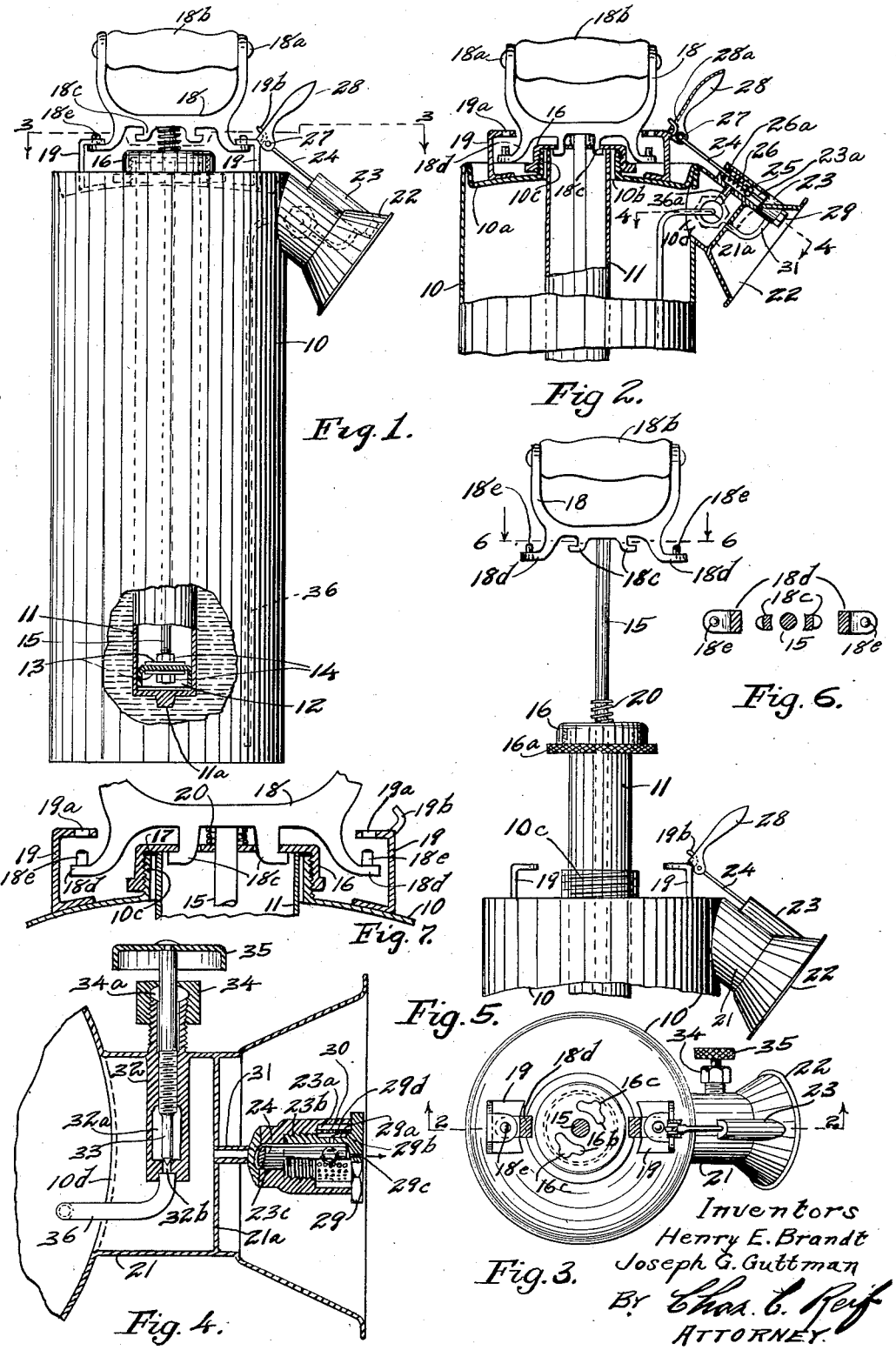
Inventors
Henry E. Brandt
Joseph G. Guttman
By Chas. C. Reif
ATTORNEY Patented Dec. 31, 1935

2,026,210

UNITED STATES PATENT OFFICE 2,026,210

DISPENSING DEVICE

Henry E. Brandt and Joseph G. Guttman, North St. Paul, Minn., assignors to The Dobbins Manufacturing Company, North St. Paul, Minn., a corporation of Minnesota Application July 21, 1934, Serial No. 736,399

11 Claims. (Cl. 221—77)

This invention relates to a sprayer for spraying liquids and while the sprayer is capable of various applications, it particularly is designed for use in spraying plants.

In one type of sprayer for such purpose a container is used to contain the liquid to be sprayed and an air pump cylinder is disposed in said container, a handle being provided for operating said air pump. The air pump is inserted through an opening in said container and this opening is also used for filling the container with liquid.

It is an object of this invention to provide a structure of sprayer comprising a container having a wall with an opening therethrough, an air pump having a cylinder insertible through said opening and including a plunger rod with a handle secured thereto, a closure member for closing said opening, said handle being provided with means for rotating said cap in either direction to loosen or tighten the same and said container and handle also having cooperating means whereby said container may be supported and carried by said handle.

It is a further object of the invention to provide a sprayer having the structure set forth in the preceding paragraph, together with means for controlling the liquid to be sprayed including a lever adapted to be grasped with the above mentioned handle.

It is a further object of the invention to provide a sprayer structure comprising a container for the liquid to be sprayed, a nozzle through which the liquid is sprayed, a bell-shaped hood surrounding said nozzle, a control valve for said nozzle including a lever, said sprayer also including a grip handle adapted to be grasped with said lever for controlling the spraying operation, said grip handle also having other functions.

It is more specifically an object of the invention to provide a sprayer structure comprising a container having a top wall with an opening therethrough and a threaded ring surrounding said opening, an air pump cylinder insertible through said opening to be disposed in said container, a cap carried by said cylinder and threaded to be screwed onto said ring to close said opening, a plunger rod extending from said cylinder through said cap and having a grip handle secured thereto, said handle having means thereon for screwing and unscrewing said cap and also having means thereon engageable with means on said container for supporting and carrying said container, said sprayer also having a discharge nozzle and control means therefor including an auxiliary handle adapted to be grasped with said first mentioned handle.

These and other objects and advantages of the invention will be fully set forth in the following description made in connection with the accompanying drawing, in which like reference characters refer to similar parts throughout the several views and in which:—

Fig. 1 is a view in side elevation of the sprayer, a portion thereof being broken away and other parts shown in vertical section;

Fig. 2 is a partial vertical section taken substantially on line 2—2 of Fig. 3;

Fig. 3 is a horizontal section taken on line 3—3 of Fig. 1;

Fig. 4 is a horizontal section taken on line 4—4 of Fig. 2, shown on an enlarged scale;

Fig. 5 is a partial view in side elevation showing the parts in different positions than in Fig. 1;

Fig. 6 is a horizontal section taken on line 6—6 of Fig. 5; and

Fig. 7 is a partial view of Fig. 2 shown on an enlarged scale.

Said sections are taken as indicated by the arrows.

Referring to the drawing, a sprayer is shown comprising a container 10 and while the container may have various shapes, in the embodiment of the invention illustrated, it is shown as cylindrical. Said container has a wall 10a shown as the top of the container, said wall having an opening 10b therethrough surrounded by an exteriorly threaded ring or hub 10c. An air pump is used with the sprayer, the same comprising a cylinder 11 which extends through opening 10b and ring 10c and is normally disposed within the container 10. Said air pump comprises a piston 12 shown as of cup shape in said cylinder, the same being shown as having washers 13 at either side thereof engaged respectively by nuts 14 threaded on a plunger rod 15. The air from cylinder 11 is forced out into tank 10 in a manner well understood and old in the art to create pressure on the liquid is tank 10. The plunger rod extends upward from cylinder 11 through a central hole in a cap member 16 of cup shape which is interiorly threaded to screw onto ring 10c. Cap 16 has a flange 16a adjacent its bottom extending outwardly and having its peripheral surface knurled. The cylinder 11 is secured to the inner side of cap 16 and a packing ring 17 of yielding material is disposed in the top of cap 16 and engages the top of ring 10c to form a tight seal. Cap 16 has a pair of oppositely disposed slots 16b in its top each of which has a central enlarged portion 16c. A handle member 18 is secured to the top of plunger rod 15 in any suitable manner, said handle comprising upwardly extending side portions between which extends a riveted rod 18a on which is journaled a grip handle 18b. Handle 18 has a horizontal portion spaced below handle 18b from which project a pair of oppositely disposed and oppositely extending lugs 18c, each having a horizontally extending lip. Handle 18 also has another pair of oppositely extending lugs 18d spaced outwardly from lugs 18c, each having a horizontally extending lip from which projects upwardly a pin 18e. Lugs 19 are secured to the top wall 10a, each formed of a small plate soldered or welded to the top of wall 10a and extending vertically therefrom, each of said lugs having an inwardly extending horizontal portion provided with an aperture 19a which may be vertically alined with pins 18e. A compression coil spring 20 surrounds the plunger rod 15 engaging the top of cap 16 with its lower end and being adapted to engage the bottom of handle 18 with its upper end.

The container 10 has an opening 10d and a cylindrical member or tube 21 is secured to said side surrounding opening 10d and communicating with the top of container 10. A partition 21a extends across the outer side of member 21 and an open ended frusto-conical or bell-shaped hood 22 projects outwardly from partition 21a, its axis extending downwardly and outwardly at approximately a 45 degree angle with the central axis of container 10. A discharge nozzle 23 extends through one side of hood 22 and is secured therein. Said nozzle comprises a cylindrical casing having a bore 23a, the same being counterbored and interiorly threaded as shown at 23b and a passage 23c extends inwardly from said threaded bore. A valve rod 24 extends centrally of passage 23c and has a collar 25 secured thereto against which one end of a compression coil spring 26 bears, the other end of said spring engaging a packing member 26a sealed against the upper end of nozzle casing 23. Rod 24 extends through said upper end and has an eyelet at its upper end through which extends a pivot pin 27 by means of which said rod is pivotally connected to a small lever handle 28. Lever handle 28 is of channel shape in cross section and has an opening 28a formed therein adjacent its end through which extends a hook shaped lug 19b extending outwardly and upwardly from one of the lugs 19. A cap-forming plug 29 having a hexagonal outer end has a threaded end portion adapted to screw into the threaded bore 23b and has a reduced portion 29a of smaller diameter than said threaded portion disposed outwardly of said threaded portion. Said plug also has a cylindrical shoulder-forming portion 29b outwardly of portion 29a and a cylindrical screen 30 fits on portion 29b and extends to the threaded portion of said plug. The bore 23a thus forms an annular chamber outside of screen 30. Plug 29 has a small central aperture 29c formed at its inner end as a valve seat with which the outer end of rod 24 which is formed as a valve cooperates. A plurality of holes 29d extend through the reduced portion 29a, these holes being arranged tangentially of the bore of plug 29. A tube 31 extends from bore 23a and the side of casing 23 to partition 21a to communicate with the top of container 10. The upper end of container 10 has compressed air therein and air is admitted to casing 23 just outside of screen 30 through tube 31. A chamber 32a is formed in a casing 32 disposed in member 21.

One end of chamber 32a has an opening 32b leading therefrom, the inner end of which is formed as a valve seat and with which cooperates a valve formed by the end of a valve stem 33 which is threaded into casing 32. Valve stem 33 projects from the outer end of casing 32, which casing extends without member 21 and is exteriorly threaded to receive the packing gland 34 surrounding stem 33 and having a chamber 34a to receive suitable packing. Stem 33 has a small hand wheel 35 secured to its outer end, the peripheral surface of which is knurled. A tube 36 extends from opening 32b to adjacent the bottom of container 10. A tube 36a extends from one side of casing 32 to casing 23 and connects the chambers in said casings.

In operation, the liquid to be sprayed will be placed in container 10. In order to place the liquid therein it is necessary to remove cap 16 and the air pump cylinder 11. To remove cap 16 the handle 18 can be pressed downwardly against the tension of spring 20 and the lugs 18c moved downwardly within cap 16 through the enlarged portion 16c of the slots 16b. Handle 18 can now be rotated in a counter-clockwise direction and the sides of lugs 18c will engage the ends of slots 16b and cap 16 will be unscrewed. When the cap is removed, it together with cylinder 11 are removed as indicated in Fig. 5 and the spraying fluid can now be placed in container 10 through the opening 10b. The cylinder 11 is then replaced and cap 16 again screwed on the ring 10c. Cap 16 can be tightly screwed in place by again depressing handle 18 and passing the lugs 18c into said cap through the enlargements 16c, the handle then being rotated in a clockwise direction. The sides of lugs 18c will engage the ends of slots 16b and said cap can be screwed tight into closing position. If it is desired to carry the sprayer about, the handle 18 is turned until the pins 18e aline with holes 19a. Spring 20 then forces the handle upwardly so that said pins enter the holes 19a. The handle is now firmly engaged with lugs 19 which are rigid with the container and the sprayer can be carried by said handle. The handle 18 can be freed from the lugs 19 by depressing the same and rotating the lugs 18d out of alinement with lugs 19. Handle 18 and rod 15 can then be reciprocated to pump air into the top of container 10 and get the desired pressure for spraying the liquid. When the device is used in spraying the pins 18e are engaged in the lugs 19 and the operator holds the grip handle 18b and at the same time can operate the lever handle 28 with his thumb or forefinger. When lever handle 28 is moved toward handle 18 it fulcrums on lugs 19b and rod 24 is moved toward handle 18. This removes the end of rod 24 from the aperture 29c and liquid is sprayed out through said aperture. The liquid passes upwardly through the tube 36 due to the pressure on top of the liquid and the amount of liquid sprayed can be nicely regulated by the valve 33 operated by the hand wheel 35. The liquid passes into tube 36a and into casing 23. The air is conducted to the annular chamber about the screen 30 and passes through said screen into the annular chamber about reduced portion 29a. The air then passes through the tangentially arranged holes 29d into the bore of plug 29 and is given a whirling motion by said holes 29d and the air engages the liquid which has entered through tube 36a so that the air and liquid are effectively mixed and both are given a whirling motion in the end of plug 29 and the mixture passes out through the opening 29c.

From the above description it will be seen that applicant has provided a very simple and efficient form of sprayer. The handle 18 is, as described, constructed and arranged to screw the cap 16 tight and to unscrew the same. It is also constructed and arranged to support and carry the sprayer as well as to be reciprocated for pumping air. Said handle is also conveniently and comfortably arranged to be grasped so that handle 28 can be simultaneously operated. The spray is efficiently discharged in a conical body through the opening 29c and is finely divided or atomized by the structure of the nozzle 23 and contained parts. The various parts of the sprayer can all be easily removed and are very accessible. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. A sprayer structure having in combination, a container for liquid to be sprayed having a wall with an opening therethrough and with a member disposed about said opening with closure engaging means thereon, a pump cylinder extending through said opening and disposed in said container, a rotatable closure member engageable with said means and movable to closed position when rotated, a plunger rod extending from said cylinder through said closure member, a handle secured to said rod, cooperating means on said handle and closure member for rotating said closure member to move the same to closed position, said cooperating means being readily disengageable whereby said handle may be reciprocated to pump air and additional cooperating means on said handle and container for supporting and carrying said container by said handle.

2. A sprayer structure having in combination, a container for liquid to be sprayed having a wall with an opening therethrough and with a threaded ring surrounding said opening, a pump cylinder extending through said opening and disposed in said container, a cap threaded on said ring, a plunger rod extending from said cylinder through said cap, a handle secured to said rod, cooperating means on said handle and cap for rotating said cap to screw the same tight and to unscrew the same, said means being readily disengageable whereby said handle may be reciprocated to pump air and resilient means normally holding said handle with said lugs disengaged from said cap.

3. A sprayer structure having in combination, a container for liquid to be sprayed having a top with an opening therethrough and a member disposed about said opening having closure engaging means thereon, a pump cylinder extending through said opening and disposed in said container, a closure member engageable with said means and movable to closed and loosened positions when rotated, a plunger rod extending from said cylinder through said closure member, a handle secured to said plunger rod, spaced members secured to the top of said container, a spring surrounding said plunger rod and engaging said closure member and handle normally urging said handle upwardly and means on said handle engageable with said last mentioned means and urged into engagement therewith by said spring whereby said container may be supported and carried by said handle.

4. The structure set forth in claim 3 and cooperating means on said closure member and handle for rotating the same in either direction by said handle, said means being engageable by depression of said handle against the pressure of said spring.

5. A sprayer structure having in combination, a container for liquid to be sprayed having a top with an opening therethrough and a member surrounding said opening having closure engaging means thereon, a pump cylinder extending through said opening, a closure member carried by said cylinder and engageable with said means and rotatable to close said opening, a plunger rod extending upwardly through said closure member from said cylinder, a handle secured to said rod, oppositely disposed lugs secured to the top of said container and having horizontally inwardly extending portions, said closure member having oppositely disposed circumferentially extending slots therethrough, said handle having depending lugs adapted to be inserted in said slots for rotating said closure member in either direction and cooperating means on said handle and the horizontally extending portions of said first mentioned lugs whereby said container can be supported and carried by said handle.

6. The structure set forth in claim 5 and a spring urging said handle upwardly to bring said last mentioned means into engagement.

7. A sprayer structure having in combination, a container for liquid to be sprayed having a top with an opening therethrough and a threaded cylindrical means surrounding said opening, a pump cylinder extending through said opening, a member threaded to said means for closing said opening, a plunger rod extending upwardly through said member, a handle secured to said rod, oppositely disposed members secured to the top of said container and having horizontally inwardly extending portions with vertically extending apertures therein, said handle having downwardly and outwardly extending lugs and pins on said lugs arranged to enter said apertures in said inwardly extending portions and resilient means urging said handle upwardly to move said pins into said apertures whereby said handle can be connected thereto and hence to said container for supporting and carrying the same.

8. A sprayer structure having in combination, a container for liquid to be sprayed having a top with an opening therethrough and a threaded cylindrical means surrounding said opening, a pump cylinder extending through said opening, a member threaded to said means for closing said opening, a plunger rod extending upwardly through said member, a handle secured to said rod, members secured to said container at opposite sides of said rod and having inwardly extending portions with apertures therethrough, said handle having downwardly and outwardly extending lugs, pins projecting upwardly from said lugs and adapted to be disposed in said apertures whereby said container may be supported and carried by said handle.

9. The structure set forth in claim 8 and resilient means urging said handle upwardly to cause said pins to be disposed in said apertures and holding the same therein.

10. A sprayer structure having in combination, a container for liquid to be sprayed having a top with a filling opening therethrough, a pump cylinder extending through said opening into said container, a rotatable closure member for said opening, a plunger handle extending upwardly from said pump cylinder, members secured to said top of said container extending upwardly and laterally and having apertures therethrough, a handle secured to the upper end of said plunger rod, the same having thereon means to engage and disengage said closure member for rotating the same and means to engage and disengage said members and to enter said apertures for carrying said container.

11. The structure set forth in claim 10, said last mentioned means comprising spaced outwardly extending lugs having upstanding pins thereon for respectively entering said apertures and a spring surrounding said plunger rod for moving said handle upwardly to move said pins through said apertures.

H. E. BRANDT.
JOSEPH G. GUTTMAN.